(12) United States Patent
Rounthwaite et al.

(10) Patent No.: US 8,606,786 B2
(45) Date of Patent: Dec. 10, 2013

(54) DETERMINING A SIMILARITY MEASURE BETWEEN QUERIES

(75) Inventors: Robert L. Rounthwaite, Fall City, WA (US); Galen Andrew, Redmond, WA (US); Emre Mehmet Kiciman, Seattle, WA (US); Xiaoxin Yin, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 12/488,603

(22) Filed: Jun. 22, 2009

(65) Prior Publication Data

US 2010/0325133 A1 Dec. 23, 2010

(51) Int. Cl.
*G06F 7/00* (2006.01)
*G06F 17/30* (2006.01)

(52) U.S. Cl.
USPC .......................................... 707/737; 707/768

(58) Field of Classification Search
USPC .................. 707/759, 777, 999.003, 737, 768
See application file for complete search history.

(56) References Cited

U.S. PATENT DOCUMENTS

| | | | |
|---|---|---|---|
| 7,149,732 B2 | 12/2006 | Wen et al. | |
| 7,158,966 B2 * | 1/2007 | Brill et al. | 1/1 |
| 7,523,105 B2 * | 4/2009 | Wen et al. | 1/1 |
| 7,565,627 B2 * | 7/2009 | Brill et al. | 715/854 |
| 7,620,628 B2 * | 11/2009 | Kapur et al. | 1/1 |
| 7,779,009 B2 * | 8/2010 | Chowdhury et al. | 707/737 |
| 2006/0074870 A1 | 4/2006 | Brill et al. | |
| 2007/0027865 A1 | 2/2007 | Bartz et al. | |
| 2007/0214115 A1 | 9/2007 | Liu et al. | |
| 2008/0288344 A1 * | 11/2008 | Thrall | 705/14 |
| 2008/0313202 A1 * | 12/2008 | Kamen | 707/101 |
| 2009/0006365 A1 * | 1/2009 | Liu et al. | 707/5 |
| 2009/0083222 A1 | 3/2009 | Craswell et al. | |
| 2009/0248662 A1 * | 10/2009 | Murdock | 707/5 |
| 2010/0094835 A1 * | 4/2010 | Lu et al. | 707/705 |
| 2010/0169300 A1 * | 7/2010 | Liu et al. | 707/709 |
| 2010/0223125 A1 * | 9/2010 | Spitkovsky | 705/14.42 |

OTHER PUBLICATIONS

Baeza-Yates et al, "Extracting Semantic Relations from Query Logs", 2007, pp. 76-85.*
Dupret et al, "Recommending Better Queries Based on Click-Through Data", 2004.*
De Bona et al, "Learning Dense Models of Query Similarity from User Click Logs", 2010.*
Francisco et al, "Clique Analysis of Query Log Graphs", 2008.*
Cui et al, "Probabilistic Query Expansion Using Query Logs", 2002.*

(Continued)

*Primary Examiner* — Brannon W Smith
(74) *Attorney, Agent, or Firm* — Medley, Behrens & Lewis, LLC

(57) ABSTRACT

A system described herein includes a receiver component that receives a dataset that is stored in a computer-readable medium of a computing device, wherein the dataset includes a plurality of queries issued by users to a search engine and a plurality of search results selected by the users upon issuing the plurality of queries. A distribution determiner component determines click distributions over the search results selected by the users with respect to the plurality of queries. A labeler component labels at least two queries in the plurality of queries as being substantially similar to one another based at least in part upon the click distributions over the search results selected by the users with respect to the plurality of queries.

20 Claims, 9 Drawing Sheets

(56) References Cited

OTHER PUBLICATIONS

Zhao et al, "Time-Dependent Semantic Similarity Measure of Queries Using Historical Click-Through Data", 2006.*

Wen at al, "Query Clustering Using Content Words and User Feedback", 2001.*

Antonellis, et al., "Simrank++: Query Rewriting through Link Analysis of the Click Graph", retrieved at <<http://www.scribd.com/document_downloads/13281647?extension=pdf&secret_password=>>,Aug. 24-30, 2008. pp. 14.

Baeza-Yates, et al,, "The Anatomy of a Large Query Graph", retrieved at <<research.yahoo.com/files/JPhys41-2008.pdf>>, May 21, 2008. pp. 13.

Baeza-Yates, et al., "An Introduction to Web Mining Part I", retrieved at <<http://www.ecmlpkdd2008.org/files/pdf/tutorials/wm1.pdf>>, 2008. pp. 132.

Beeferman, et al., "Agglomerative Clustering of a Search Engine Query Log", retrieved at <<https://eprints.kfupm.edu.sa/23259/1/23259.pdf>>, pp. 10.

Shen, et al., "MiningWeb Query Hierarchies from Clickthrough Data", retrieved at <<http://www.cse.ust.hk/~qyang/Docs/2007/aaai07.Shen.pdf>>, pp. 6.

* cited by examiner

DETERMINING A SIMILARITY MEASURE BETWEEN QUERIES

BACKGROUND

An amount of information available by way of the World Wide Web has grown exponentially, such that billions of items are available by way of the World Wide Web. This explosive growth of information available on the web has not only created a crucial challenge for search engine companies in connection with handling large scale data, but has also increased the difficulty for a user to manage his/her information needs. For instance, it may be difficult for a user to compose a succinct and precise query to represent his/her information needs.

Instead of pushing the burden of generating succinct search queries to the user, search engines have been configured to provide increasingly relevant search results. More particularly, a search engine can be configured to retrieve documents relevant to a user query by comparing attributes of documents together with other features such as anchor text, and can return documents that best match the query. Conventional search engines can also consider previous user searches, user location, and current events, amongst other information in connection with providing the most relevant search results to a query issued by a user. The user is typically shown a ranked list of universal resource locators (URLs) in response to providing a query to the search engine.

Moreover, at least some search engines are configured with functionality to provide a user with alternative queries to a query provided by the user. Such alternative queries can be configured to correct possible spelling mistakes, may be configured to provide the user with information that is related but non-identical to information retrieved by way of the query provided by the user, etc. These query suggestions typically include queries issued by users subsequent to the users issuing an initial query. For instance, if a user types a query "msg" to a search engine, the user may be provided with quite a few alternative potential queries such as "Madison Square Garden," "Monosodium Glutamate," and others.

SUMMARY

The following is a brief summary of subject matter that is described in greater detail herein. This summary is not intended to be limiting as to the scope of the claims.

Described herein are various technologies pertaining to determining a measure of similarity between two queries (e.g., whether two queries are substantially similar queries) and to organizing queries based upon measures of similarity therebetween. The measure of similarity refers to how closely two queries model a same informational need of users. Thus, the queries "sofa" and "couch" may be substantially similar queries, since such queries model substantially similar information needs of users (e.g., a first user who issues the search query "sofa" to a search engine is likely to be searching for substantially similar information when compared a second user who issues the search query "couch").

A measure of similarity between two search queries can be ascertained by analyzing click distributions over search results for the two queries. For example, a plurality of users over time may issue a first search query, and such users can select certain search results upon issuing the first query. For instance, a particular search result $U_1$ may make up 25% of clicks upon issuance of the first query to a search engine and another particular search result $U_2$ may make up 75% of clicks upon issuance of the first query to the search engine.

Similarly, a plurality of users may issue a second query (different from the first query), and such users can also select particular search results upon issuing the second query. In an example, 25% of clicks after issuance of the second query may be on $U_1$ and 75% of clicks after issuance of the second query may be on $U_2$. By analyzing the click distribution over the search results with respect to the two queries, it can be ascertained that the two queries model a substantially similar information need/goal of users, and thus the two queries can be given a high measure of similarity (e.g., labeled as substantially similar queries). For instance, cosine similarity of click distributions over search results with respect to two queries can be employed to estimate a measure of similarity between the two queries.

Pursuant to an example, a bipartite (click) graph can represent relationships between queries and search results. For instance, the bipartite graph can include a plurality of nodes that represent queries and a plurality of nodes that represent search results selected by users upon issuing the queries. Edges can couple nodes that represent queries with nodes that represent search results, wherein an edge between a first node and a second node indicates that at least one user selected a search result represented by second node upon issuing a query represented by the first node. The edges can be weighted to indicate a number of selections (clicks) on a certain search result given a particular query. In an example, the graph can be a general click graph, where edges only exist between nodes if there was a selection of a search result for a particular query. In another example, the graph can be a session click graph, wherein selections of search results can be assigned to more than one query that occurred during a defined search session. For instance, a user may issue a first query, select one or more search results, and then shortly thereafter issue a second query and select additional search results. The search results selected after issuance of the second query can be assigned to the first query, since such selections were undertaken in a single search session.

Other aspects will be appreciated upon reading and understanding the attached figures and description.

DETAILED DESCRIPTION

Figure 1:
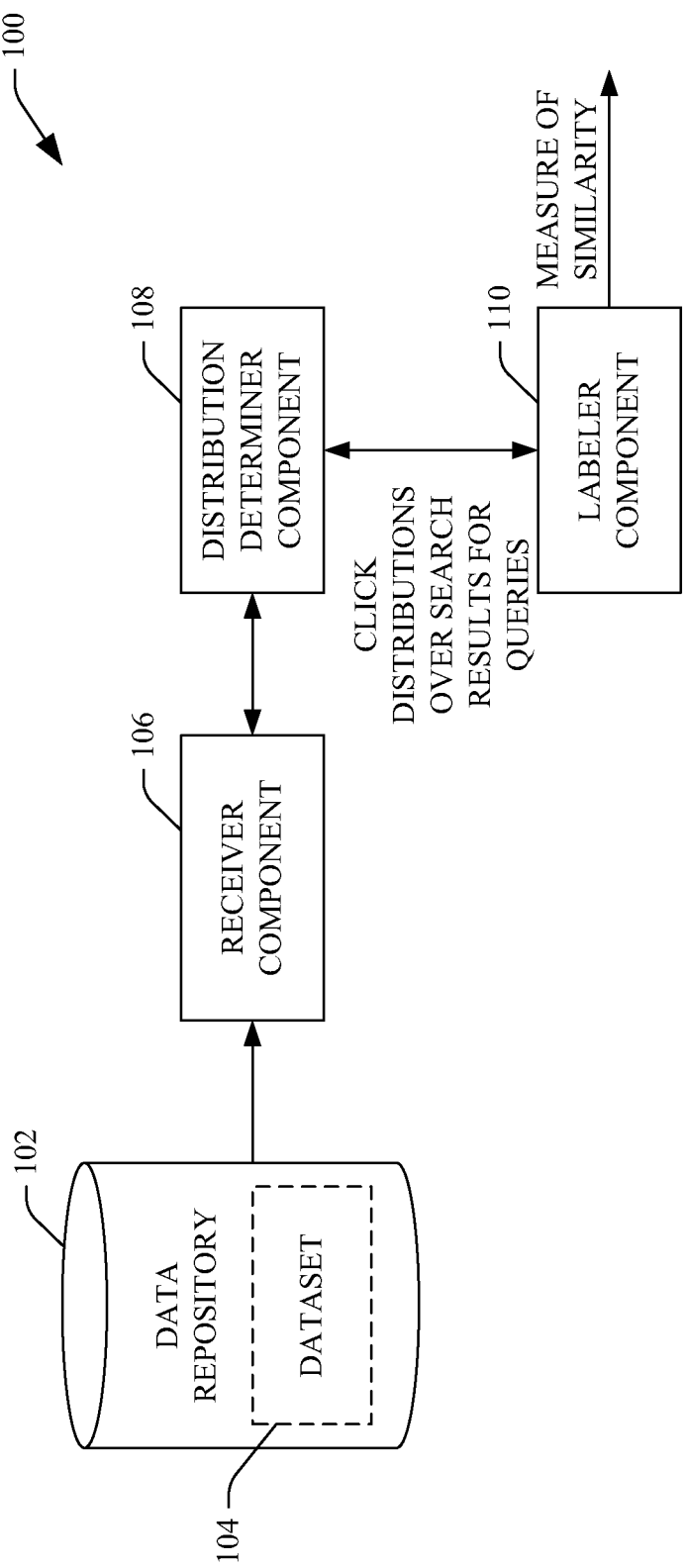
FIG. 1 is a functional block diagram of an example system that facilitates determining a measure of similarity between two queries.

Various technologies pertaining to determining a measure of similarity between queries will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates determining a measure of similarity between two queries is illustrated. For example, the system 100 can reside on a server and can be used in connection with a web-based search engine. As used herein, the term "measure of similarity" can refer to how closely, based upon user interaction with search results returned upon certain queries being issued, two queries model a substantially similar informational need of a user. In other words, users may have substantially similar informational needs, and may use two different queries to retrieve desired information. Based upon search results clicked on by the users, it can be ascertained that the two queries are substantially similar in nature, as click distributions over search results with respect to the two queries (search results clicked on by users who issued the two queries) may indicate a relation between queries.

The system 100 includes a data repository 102 that comprises a dataset 104. The data repository 102 can be any suitable computer-readable medium in a computing device or distributed across computing devices. The dataset 104 can include a plurality of queries issued to a search engine by users of the search engine, search results provided by the search engine responsive to receipt of the queries, search results selected (clicked) by users with respect to certain queries, timestamps indicating when queries were issued and when search results were selected, amongst other data.

Pursuant to an example, the dataset 104 can be embodied in the data repository 102 as a bipartite graph, wherein the bipartite graph includes a first plurality of nodes and a second plurality of nodes, and wherein nodes in the first plurality of nodes can be coupled to nodes in the second plurality of nodes by edges. The first plurality of nodes can represent queries issued by users and the second plurality of nodes can represent search results clicked on by users that issued the queries. An edge that couples a first node in the first plurality of nodes with a second node in the second plurality of nodes indicates that at least one user who issued a query represented by the first node clicked on a search result represented by the second node. The edge can be weighted based at least in part upon a number of clicks on the search result when the query is issued by users. Thus, the bipartite graph can represent click distributions over search results for a variety of queries issued by users. Other manners for representing click distributions, however, are contemplated and intended to fall under the scope of the hereto-appended claims.

The system 100 also includes a receiver component 106 that can receive the dataset 104 that is stored in the data repository 102. A distribution determiner component 108 can analyze the dataset 104 and can determine click distributions (for a plurality of queries) over search results selected by users of the search engine. In an example, the distribution determiner component 108 can analyze contents of the dataset 104 and can ascertain that a first query and a second query have at least one clicked search result in common (e.g., a first user issued the first query and clicked on a search result and the first user or another user issued the second query and clicked on the same search result). The distribution determiner component 108 may then determine a first click distribution over search results for the first query and determine a second click distribution over search results for the second query. The distribution determiner component 108 may output click distributions for one or more query pairs that have at least one clicked search result in common.

The distribution determiner component 108 may perform some sort of pruning of the dataset 104 prior to determining click distributions for queries over search results. For example, the distribution determiner component 108 can ensure that a query has been issued a threshold number of times, and if the number is below the threshold, the distribution determiner component 108 can fail to consider such query. In another example, the distribution determiner component 108 can ensure that a search result has been clicked by users a threshold number of times, and can fail to consider a search result if the search result lacks the requisite number of clicks.

A labeler component 110 can receive click distributions over search results for one or more query pairs and can output a measure of similarity between queries in a query pair based at least in part upon the click distributions. In an example, the labeler component 110 can determine a cosine similarity between click distributions with respect to queries in a query pair. For instance, the labeler component 110 can receive a first click distribution over search results with respect to a first query and can receive a second click distribution over search results with respect to a second query, and can output a cosine similarity of the first click distribution and the second click distribution. For instance, the labeler component 110 can utilize the following algorithm in connection with outputting the cosine similarity of the pair of distributions:

$$\text{cosine similarity} = \frac{\Sigma_i P(U_i | Q_A) P(U_i | Q_B)}{\sqrt{\Sigma_i P(U_i | Q_A)^2 \Sigma_i P(U_i | Q_B)^2}},$$

where $U_i$ represents an ith search result, $Q_A$ represents the first query, $Q_B$ represents the second query, $P(U_i|Q_A)$ represents a probability that the search result $U_i$ was selected by a searcher given the first query $Q_A$, and $P(U_i|Q_B)$ represents a probability that the search result $U_i$ was selected by a searcher given the second query $Q_B$.

The labeler component 110 may assign a label of similarity to the query pair based at least in part upon a cosine similarity score with respect to click distributions of the queries in the query pair. For example, if the cosine similarity score is above a predefined threshold, the labeler component 110 can label the first query as being substantially similar to the second query. The labeler component 110 can perform such labeling for each query pair, and can cause labels of similarity for query pairs to be stored in a data repository (e.g., the data repository 102). In another example, and as will be described in greater detail below, the labeler component 110 can cluster queries based at least in part upon cosine similarity scores between queries in query pairs, such that a cluster can include multiple queries that are at least somewhat similar to one another. Furthermore, the labeler component 110 can determine a measure of similarity between two queries only if one of such queries is sufficiently popular (e.g., has been issued a threshold number of times to the search engine by users).

The measure of similarity determined by the labeler component 110 can be used in a variety of applications. For example, a user can request to view a query history with respect to queries previously issued by the user, and the query history of the user can be organized based at least in part upon measures of similarity between queries. Queries that are found to be similar to one another (e.g., based upon similarity measures between queries) can be grouped together, or a group of similar queries can be summarized by a particular key query in the group. Queries that are deemed to be similar enough to one another can be combined into a single unit. Grouping (clustering) of queries is described in greater detail below. In another example, one or more queries can be provided as suggested queries to a query issued by a user based at least in part upon measures of similarity among queries. Furthermore, query suggestions can be removed based at least in part upon measures of similarity between queries (e.g., supplying a suggested query that is completely synonymous to a query submitted by a user may not help the user refine the query issued by the user). In yet another example, queries can be substituted for one another or query terms can be modified or replaced based at least in part upon measures of similarity between queries.

Additionally, while the dataset 104 was described above as being an embodiment of a general click graph, in another example the dataset 104 may be an embodiment of a session click graph. A session click graph is a click graph where selected (clicked) search results may be assigned to a query that was not employed to locate such search result, but was instead issued earlier in a search session, wherein a search session can be defined as a window of time, a chained window of time (e.g., so long as consecutively issued queries are issued within a threshold amount of time from one another the search session will continue), a series of related or similar queries (within a threshold window of time or with no regard for time), or other suitable manner for defining a search session.

In an example, a user may issue a first query and click on a search result, click on multiple search results, or click on no search results. Shortly thereafter, the user may issue a second query and click on one or more search results upon issuing the second query. The search results selected upon searching via the second query can be assigned to the first query. Optionally, search results clicked on by the user upon issuing the first query can be assigned to the second query. The distribution determiner component 108 may then output click distributions over search results for queries in a query pair based at least in part upon the session click graph, and the labeler component 110 can output a measure of similarity based at least in part upon the click distributions over the search results with respect to the queries in the query pair.

Figure 2:
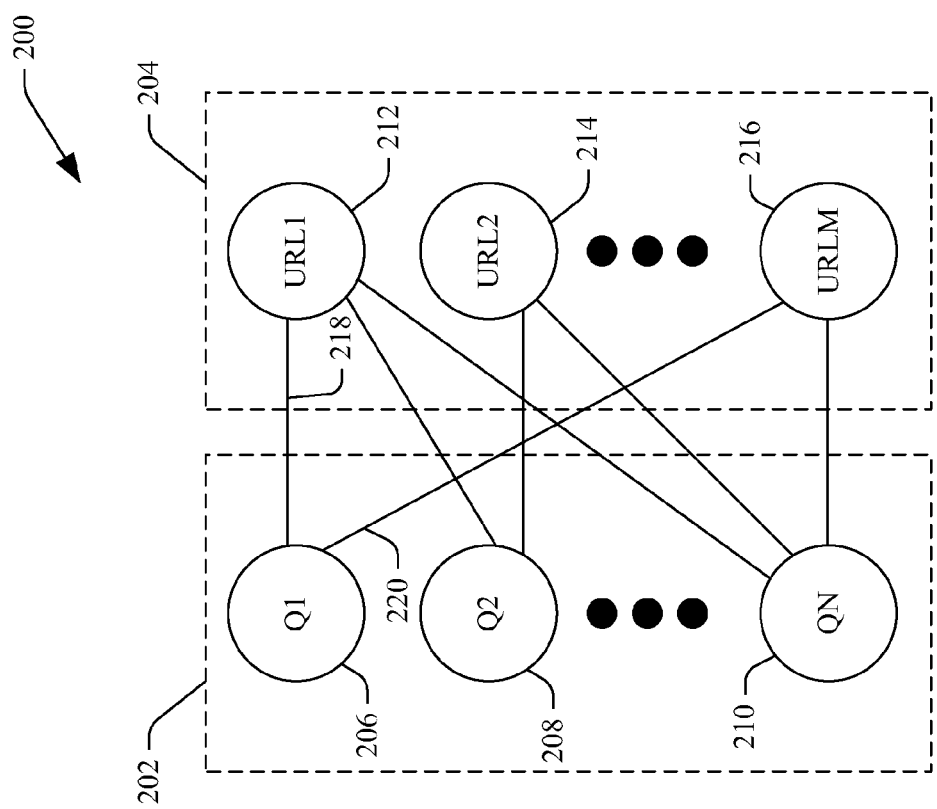
FIG. 2 is an example bipartite click graph.

Referring now to FIG. 2, an example bipartite graph 200 is illustrated. The graph 200 includes a first set of nodes 202 that represent queries submitted by users and a second set of nodes 204 that represent URLs (search results) selected by users when the queries represented by the first set of nodes 202 were submitted to a search engine. An edge exists between a node in the first set of nodes 202 and a node in the second set of nodes 204 if a user clicked on a URL represented by the node in the second set of nodes 204 when the user submitted a query represented by the node in the first set of nodes 202.

In an example, the first set of nodes 202 includes a first node 206, a second node 208, and an Nth node 210 that represents a first query, a second query and an Nth query, respectively. A second set of nodes 204 can include a first node 212, a second node 214 and an Mth node 216 to represent a first URL, a second URL and an Mth URL, respectively. As can be discerned from reviewing the example graph 200, an edge 218 couples the node 206 and the node 212. Accordingly, at least one user selected the first URL when the first query was submitted. Additionally, an edge 220 couples the node 206 with the Nth node 216. Therefore, one or more users selected the Nth URL when the first query was submitted by the one or more users.

As noted above, edges in the bipartite graph 200 can be weighted based at least in part upon a number of user selections of URLs when certain queries were submitted to a search engine. Pursuant to an example, the first query represented by the first node 206 may have been submitted by users one hundred different times. Out of the one hundred submissions of the first query, the first URL represented by the node 212 may have been selected sixty times while the Nth URL represented by the node 216 may have been selected forty times. Accordingly, the edge 218 may be assigned a greater non-normalized weight when compared to a non-normalized weight assigned to the edge 220. As noted above, the distribution determiner component 108 and the labeler component 110 (FIG. 1) can use a bipartite graph such as the bipartite graph 200 in connection with determining a measure of similarity between query pairs.

Figure 3:
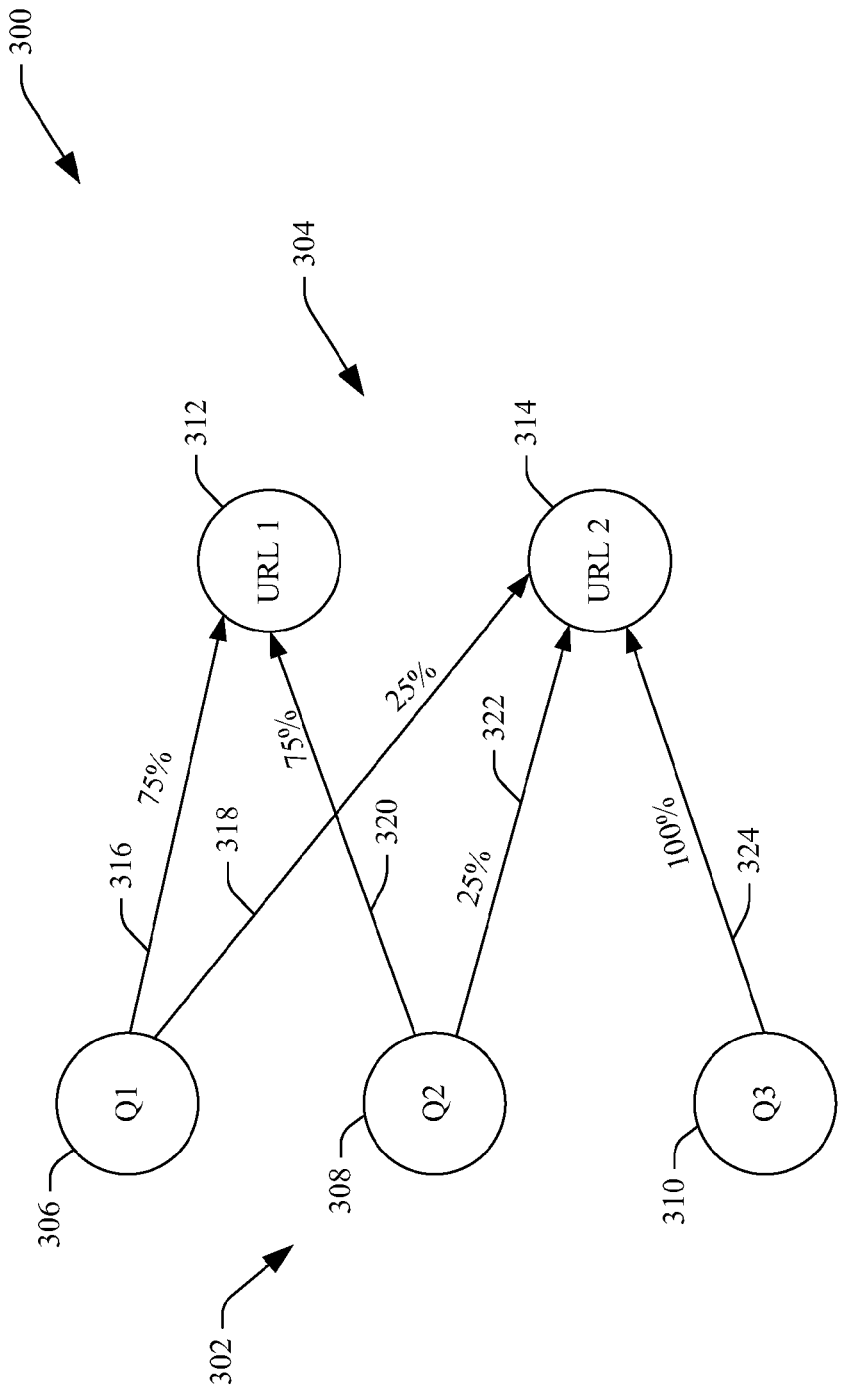
FIG. 3 is an example representation of data that can be used to determine a measure of similarity between a pair of queries.

Turning now to FIG. 3, an example bipartite graph 300 is illustrated, wherein click distributions with respect to queries over search results are depicted. The bipartite graph 300 includes a first set of nodes 302 and a second set of nodes 304. The first set of nodes 302 comprises a first node 306 that represents a first query issued by one or more users of a search engine, a second node 308 that represents a second query issued by one or more users of the search engine, and a third node 310 that represents a third query issued by one or more users of the search engine. The second set of nodes 304 comprises a fifth node 312 that represents a first search result clicked by at least one user who issued either the first query or the second query and a sixth node 314 that represents a search result clicked by at least one user that issued the first query, the second query, or the third query.

The bipartite graph 300 comprises edges 316-324, wherein the edges 316-324 represent relationships between queries and search results. For example, the edge 316 indicates that at least one user who issued the first query selected the first search result (URL). Similarly, the edge 318 can indicate that at least one user who issued the first query selected the second search result. Additionally, edges of the bipartite graph can be weighted, wherein weights can be indicative of click distribution for a query over selected search results. For instance, the weight of the edge 316 can indicate that seventy five percent of clicks corresponding to the first query are on the first search result and the weight of the edge 318 can indicate that twenty five percent of clicks corresponding to the first query are on the second search result.

As can be discerned from reviewing the bipartite graph 300, the first query and the second query are maximally similar to one another, as the first query and the second query have substantially similar click distributions over the search results. The third query is not maximally similar to the first query or the second query, as one hundred percent of clicks corresponding to the third query are on the second search result. It is to be noted that similarity between two queries is not a function of the structure of the bipartite graph. In other words, the similarity measure determined by the labeler component 110 between the first and second query (FIG. 1) is not a function of the third query or the click distribution corresponding to the third query.

Figure 4:
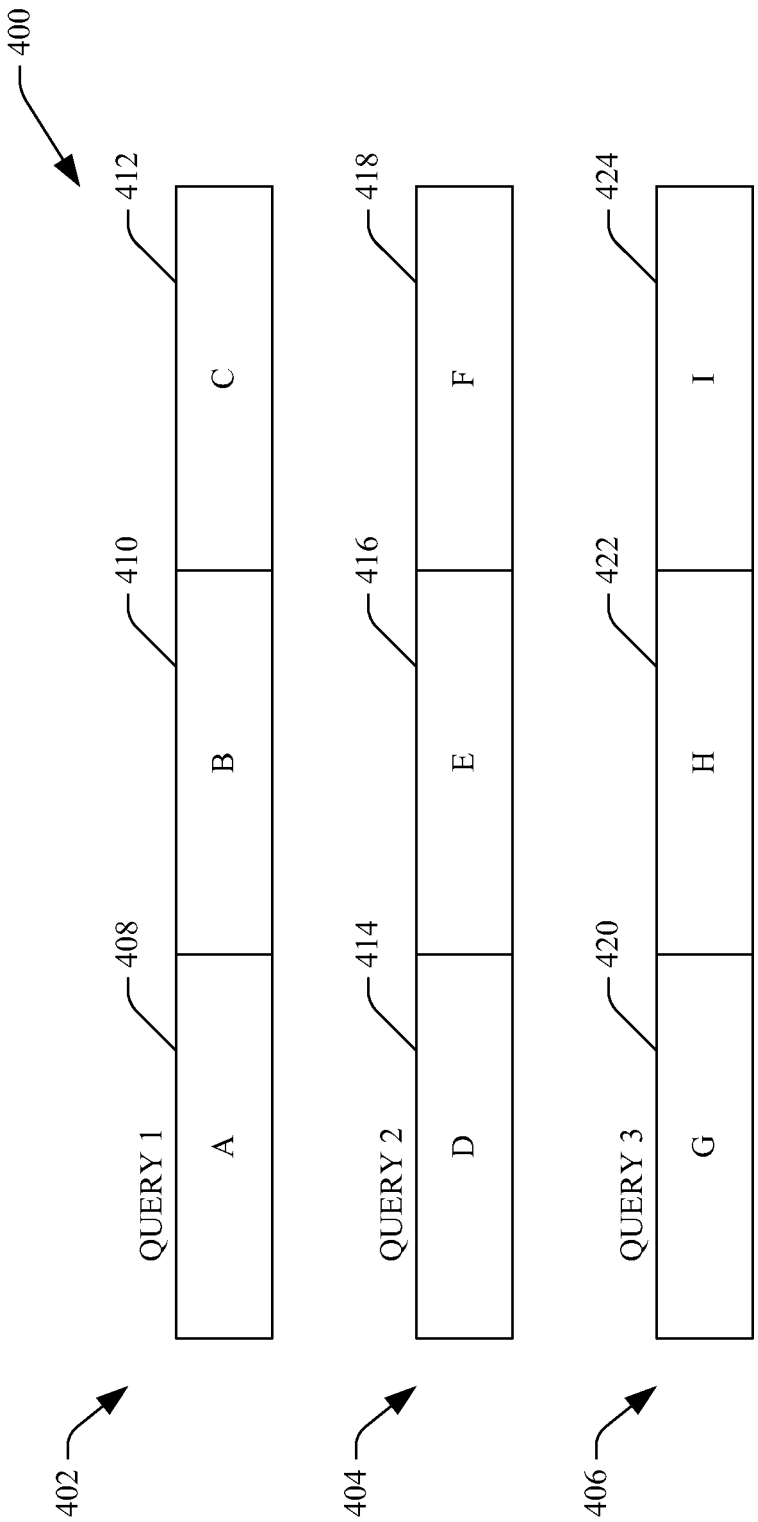
FIG. 4 illustrates example vectors that can represent data used to determine a measure of similarity between a pair of queries.

Now turning to FIG. 4, an example depiction 400 of another manner of representing queries issued to a search engine and search results clicked upon issuance of the queries is illustrated. In the example depiction 400, three vectors correspond to three different queries. A first vector 402 corresponds to a first query, a second vector 404 corresponds to a second query, and a third vector 406 corresponds to a third query.

Each of the vectors 402-406 includes multiple entries, wherein each entry corresponds to a search result clicked when the queries corresponding to the vectors were submitted to a search engine. For example, the first vector 402 can have a first entry 408 that corresponds to a first search result clicked by users that issued the first query, a second entry 410 that corresponds to a second search result clicked by users that issued the first query, and a third entry 412 that corresponds to a third search result clicked by users that issued the first query. The entries 408-412 can have values that indicate a number of times that the search results were clicked when the first query was issued. For example, the search result corresponding to entry 408 was clicked "A" number of times when the first query was issued.

The other vectors 404 and 406 can also include entries that correspond to search results. In this example, the second vector 404 can include three entries 414-418, wherein such entries correspond to the first, second, and third search results, respectively, described above. Likewise, the third vector 406 can include entries 420, 422, and 424 that correspond to the first, second, and third search results, respectively. Of course, the vectors 404 and 406 may include entries that do not correspond to the first, second, and third search results. The vectors 404-406 can be analyzed to determine click distributions over search results with respect to query pairs.

Figure 5:
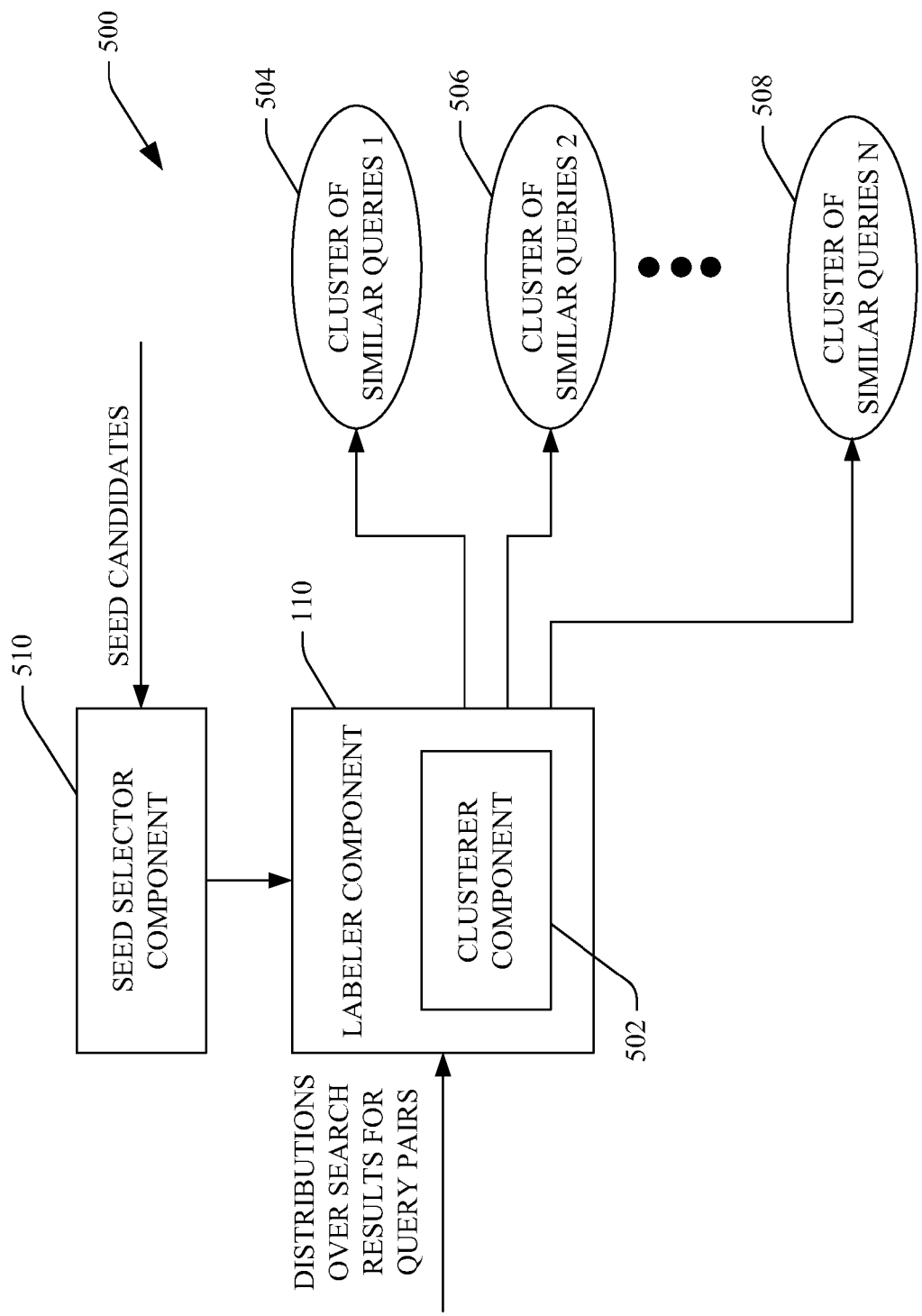
FIG. 5 is a functional block diagram of an example system that facilitates clustering queries into clusters of similar queries.

Now referring to FIG. 5, an example system 500 that facilitates clustering queries based at least in part upon a measure of similarity corresponding thereto is illustrated. The system 500 includes the labeler component 110 that receives click distributions over multiple query pairs as described above. The labeler component 110 includes a clusterer component 502 that clusters a plurality of queries into multiple clusters 504-508 based at least in part upon measures of similarity between queries in pairs of queries computed by the labeler component 110. For example, the clusterer component 502 can cluster queries into a plurality of clusters of substantially similar queries. Pursuant to an example, at least one of the clusters 504-508 can include three or more queries.

The clusterer component 502 can utilize any suitable clustering mechanism when clustering queries. For instance, the clusterer component 502 can select a first query and cause a first set of queries that have a similarity measure (with respect to the first query) that is above a threshold to be clustered with the selected first query. The clusterer component 502 may then include other queries that have similarity measures that are above a threshold with respect to queries in the first set of queries to be included in the cluster. This sort of chaining can continue until there are no further queries that have a similarity measure that is above a threshold with respect to queries already in the cluster. Thereafter, another cluster of queries can be generated.

In another example, a seed selector component 510 can select one or more queries as seed queries, and the clusterer component 502 can generate clusters based upon the one or more seed queries. In an example, the seed selector component 510 can select a most popular query (a query issued most by users) from a plurality of seed candidates, and can provide such query to the clusterer component 502. The clusterer component 502 may then cause queries that have similarity measures above a threshold (with respect to the selected seed query) to be included in a cluster of queries. The seed selector component 510 may then provide the clusterer component 502 with a next most popular query (that is not already included in a cluster), and the clusterer component 502 can generate another cluster around such seed query. This process can iterate until there are no further queries to cluster, for example.

In another example, the seed candidates may be a predefined list of queries. For instance, a search engine can include a list of predefined queries that, when issued by a user, provide the user with an enhanced search experience (e.g., additional photographs, lists of other popular queries, . . . ). These predefined queries can be seed queries, wherein such queries are restricted from being included in clusters pertaining to other seed queries. The clusterer component 502 can generate the clusters around such seed queries.

The clusters 504-508 may be utilized in a variety of applications. For instance, if a user issues a query to a search engine, a cluster that includes the query can be accessed. Other queries in the cluster can be presented to the user as alternate queries. In another example, a user can issue a query to the search engine, and the search engine can execute multiple searches using one or more other queries that are clustered with the query issued by the user. The search engine may be configured to combine results retrieved based upon queries from a particular cluster of queries. In yet another example, the clusters can be utilized to expand a list of predefined queries. As noted above, a search engine may include predefined queries that, when executed by a user, provide the user with an enhanced search experience. The clusters 504-508 can be used to locate synonyms for such predefined queries, thereby expanding the list of predefined queries.

Moreover, parameters pertaining to clustering can be altered depending upon a desired application. For example, if the clusters 504-508 are desirably employed to locate synonyms of queries, the clusterer component 510 can be configured to enforce a higher threshold with respect to similarity measures between queries to be included in a cluster. If the clusters 504-508 are desirably employed to locate similar but non-identical queries, the clusterer component 510 can be configured to enforce a lower threshold. In an example, if a user issues a query and the search engine has no query suggestions for such query, the clusterer component 510 can be employed to cluster queries using a lower similarity measure threshold to provide the user with at least one query suggestion.

Figure 6:
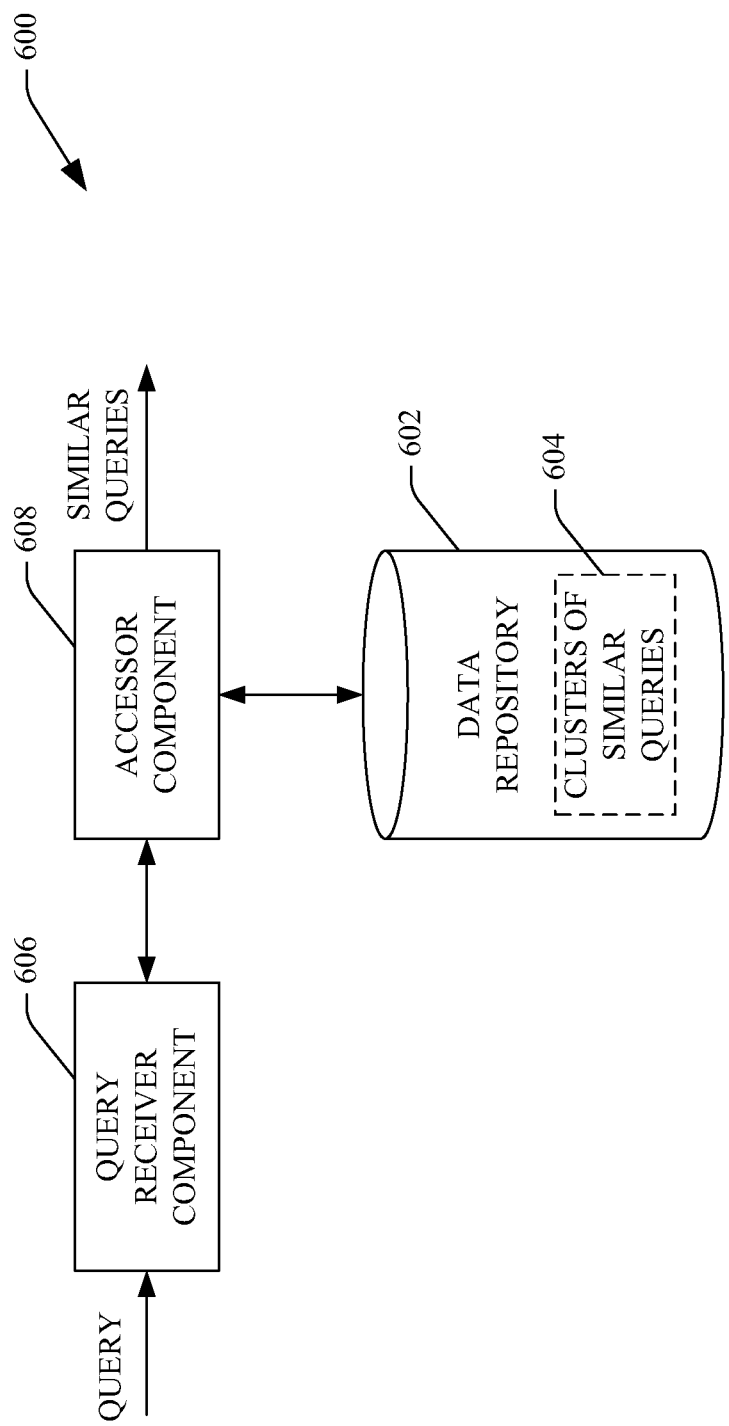
FIG. 6 is a functional block diagram of an example system that facilitates utilizing measures of similarities between queries to perform a computing process.

Now referring to FIG. 6, an example system 600 that facilitates performing an action through utilization of clusters of similar queries is illustrated. For example, the system 600 can be employed in connection with a web-based search engine. The system 600 includes a data repository 602 that comprises clusters of similar queries 604. Clustering queries based at least in part upon a similarity measure between queries in a query pair has been described above.

The system 600 further includes a query receiver component 606 that can receive a query issued by a user, wherein the user issues the query in an attempt to locate certain information. For instance, the query receiver component 606 may be included in or be in communication with a search engine that is configured to execute a search using queries received from users. An accessor component 608 is in communication with the query receiver component 606, and can access the data repository 602 to locate a cluster of queries that includes the query received by the query receiver component 606. The accessor component 608, upon retrieving a cluster of queries that are similar to the received query, can perform one of a plurality of different actions.

In an example, the accessor component 608 can output at least one query in a cluster with the received query to a search engine, which can execute a search using the received query and the at least one query in the cluster with the received query. In another example, the accessor component 608 can alter the received query to replace a term therein with a term from a query in the cluster of queries. In yet another example, the accessor component 608 can cause at least one query in the cluster of queries to be presented to a user as a suggested query with respect to the query issued by the user. In yet another example, suggested queries can be presented to the user based upon some conventional mechanism, such as presenting the user with queries that typically follow the received query (e.g., queries issued by other users after issuing the query). The accessor component 608 can remove at least one query from the suggested queries if the at least one query is included in the cluster of queries with the received query. Thus, a query that is substantially similar (e.g., is directed towards substantially similar information) can be removed from a list of suggested queries, thereby allowing other queries to be included in the list of suggested queries.

Furthermore, the accessor component 608 can forward queries in the clusters of similar queries to an advertisement component (not shown). The advertisement component may present queries to the user that correspond to the query as well as to queries that are included in the cluster of similar queries. For instance, an auction can be held on search terms in the received query as well as on terms in queries in the cluster of queries, and advertisements can be displayed that correspond to winners of the auction.

Figure 7:
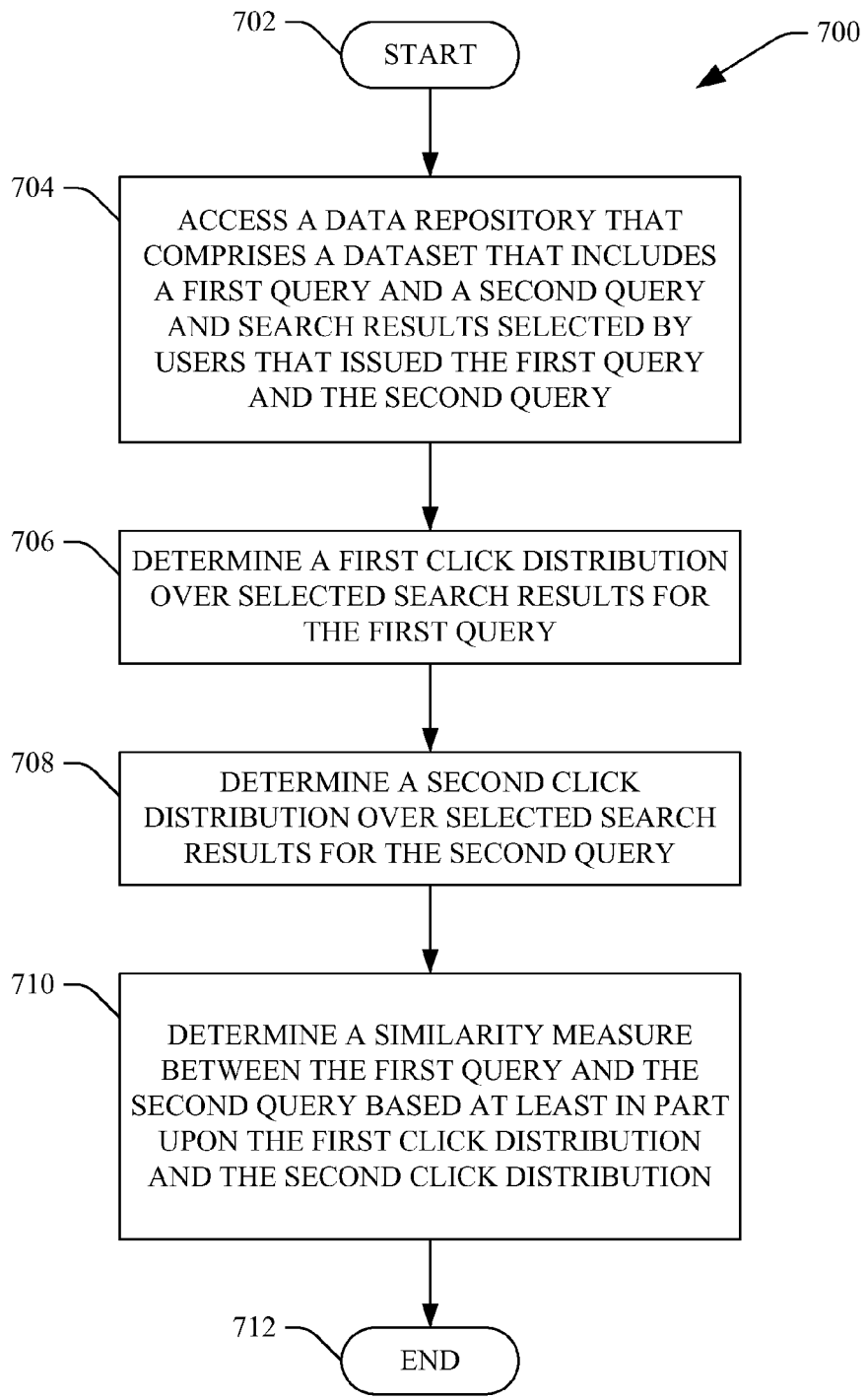
FIG. 7 is a flow diagram that illustrates an example methodology for determining a measure of similarity between queries.
Figure 8:
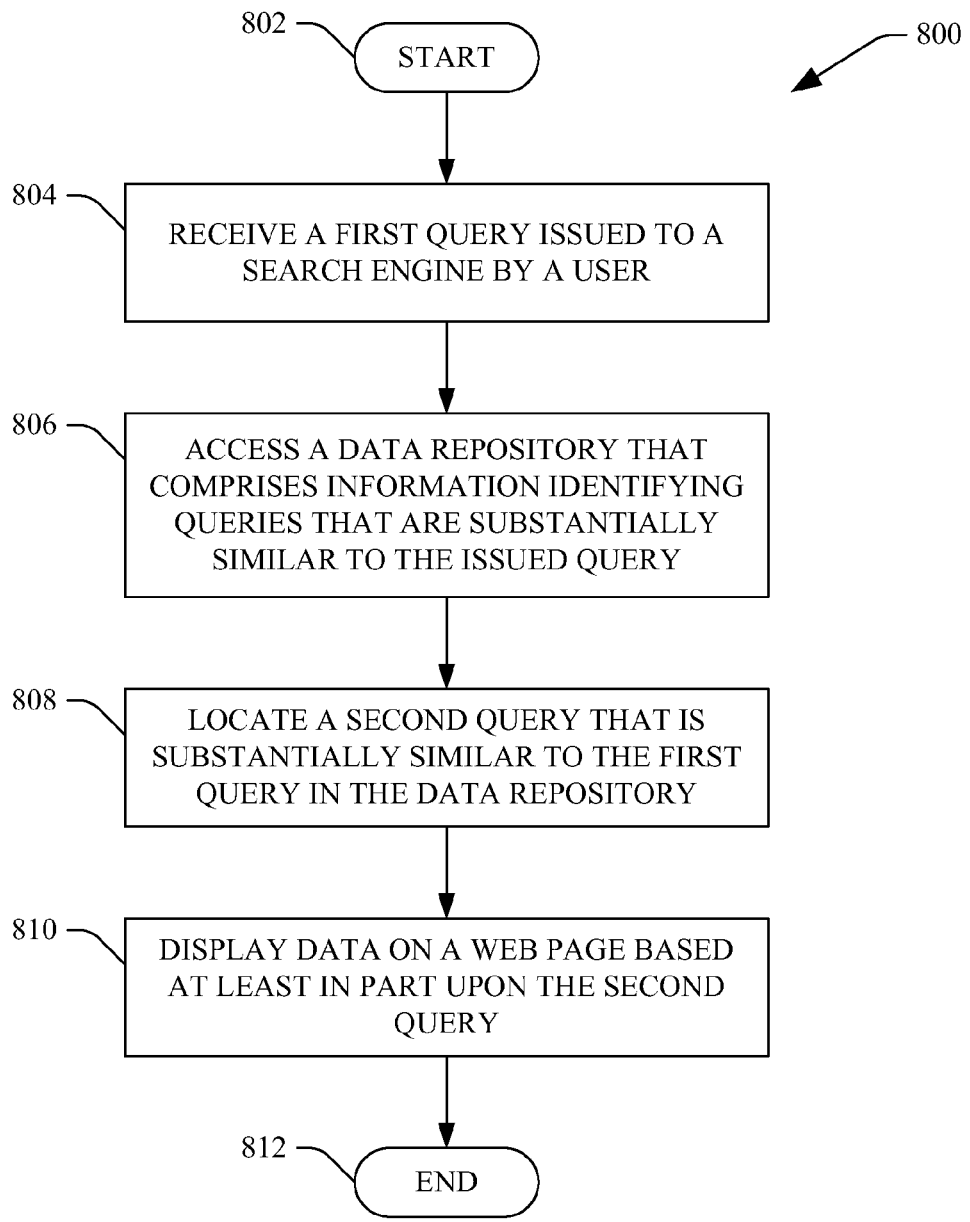
FIG. 8 is a flow diagram that illustrates an example methodology for displaying data on a web page based at least in part upon a query that is substantially similar to a query issued by a user.

With reference now to FIGS. 7-8, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 7, a methodology 700 that facilitates determining a measure of similarity between a pair of queries is illustrated. The methodology 700 begins at 702, and at 704 a data repository in a computing device is accessed. The data repository can include a first query and a second query that were issued by users of a search engine. The data repository can also include search results clicked (selected) by users that issued the first query and the second query.

At 706, a first click distribution over search results is determined for the first query, and at 708 a second click distribution over search results is determined for the second query.

At 710, a similarity measure is output as an indication of similarity between the first query and the second query. In an example, the first query and the second query can be labeled as being substantially similar to one another based at least in part upon the determined first click distribution and the determined second click distribution. For instance, the measure of similarity between the first query and the second query can be determined through use of a cosine similarity of the first click distribution and the second click distribution. The methodology 700 completes at 712.

With reference now to FIG. 8, an example methodology 800 for utilizing a similarity measure between queries to display data on a web page is illustrated. The methodology 800 starts at 802, and at 804 a first query issued by a user to a search engine is received. The query can be a word, an acronym, a phrase, a sentence, a number or series of numbers, a letter, a combination of numbers and letters, etc.

At 806, a data repository is accessed that comprises information identifying queries that are substantially similar to the issued query. For example, the received query may be included in a cluster, where queries in the cluster have a similarity value with respect to at least one other query in the cluster that is above a threshold value. Clustering queries has been described above.

At 808, a second query is located that is substantially similar to the first query, wherein the second query is located in the data repository. Again, this can be undertaken by analyzing a cluster and/or by analyzing a similarity measure between the first query and the second query.

At 810, data is displayed on a web page based at least in part upon the second query. For instance, suggested queries can be displayed, wherein the suggested queries include the second query. In another example, an advertisement that corresponds to one or more terms of the second query can be displayed to the user on the web page. In yet another example, search results that correspond to the second query can be presented to the user on the web page. In an additional example, user contributions, such as comments, discussions, additions of search results, deletions of search results, re-rankings, and edits of suggested or related search queries, can be collected in the context of search queries. These contributions may be collected from any user, group of users, or all users. When one user initiates a search query, the system may display contributions from the user or other users. The contributions to be displayed may be chosen in whole or in part based on the similarity between the user's initiated query and the query context of each contribution.

The methodology 800 completes at 812.

Figure 9:
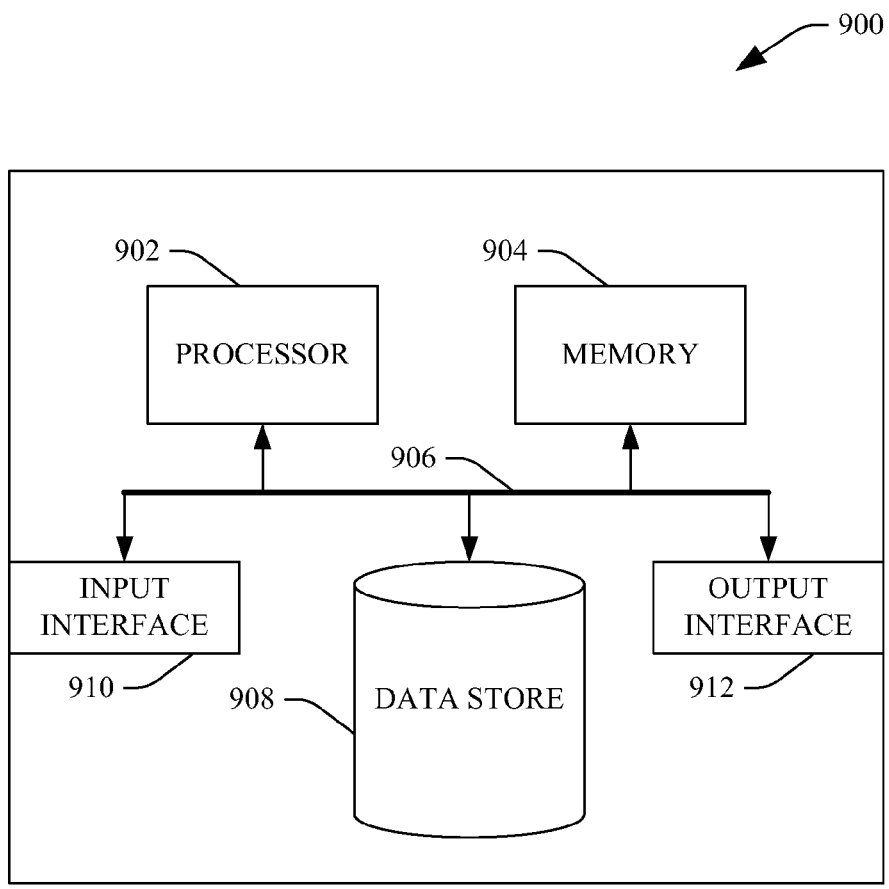
FIG. 9 is an example computing system.

Now referring to FIG. 9, a high-level illustration of an example computing device 900 that can be used in accordance with the systems and methodologies disclosed herein is illustrated. For instance, the computing device 900 may be used in a system that supports determining a similarity measure between a pair of queries used to perform web-based searches. In another example, at least a portion of the computing device 900 may be used in a system that supports presenting data on a web page based at least in part upon a query being included in a cluster of similar queries. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store a click graph, a session click graph, etc.

The computing device 900 additionally includes a data store 908 that is accessible by the processor 902 by way of the system bus 906. The data store 908 may include executable instructions, a click graph, a session click graph, advertisements, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
accessing a data repository in a computing device, wherein the data repository comprises a plurality of queries issued by users of a search engine and sets of search results selected by issuers of respective queries in the plurality of queries;
determining, for each query in the plurality of queries, a click distribution over a respective set of search results for a respective query;
determining measures of similarity between queries in the plurality of queries based at least in part upon click distributions over the sets of search results for each of the respective queries, wherein a measure of similarity between a first query and a second query is a cosine similarity of click distributions over respective sets of search results for the first query and the second query, the measure of similarity computed as a function of:
a first probability that a first searcher that issued the first query will select a first search result; and
a second probability that a second searcher that issued the second query will select the first search result, wherein the first probability and the second probability are computed based at least in part upon the click distributions over the sets of search results for each of the respective queries;
from amongst unclustered queries in the plurality of queries, selecting a query that is most often submitted to the search engine as a seed query;
executing a clustering algorithm over the unclustered queries in the plurality of queries utilizing the seed query, wherein queries from the unclustered queries are placed into a cluster with the seed query if measures of similarity between the seed query and respective unclustered queries are above a threshold;
labeling queries in the cluster as being similar queries; and
repeating acts of selecting, executing, and labeling until there are no unclustered queries.

2. The method of claim 1, wherein the cosine similarity of click distributions is computed by way of the following algorithm:

$$\text{cosine similarity} = \frac{\sum_i P(U_i \mid Q_A) P(U_i \mid Q_B)}{\sqrt{\sum_i P(U_i \mid Q_A)^2 \sum_i P(U_i \mid Q_B)^2}},$$

where $U_i$ represents an ith search result, $Q_A$ represents the first query, $Q_B$ represents the second query, $P(U_i|Q_A)$ represents a probability that the search result $U_i$ was selected by the first searcher, and $P(U_i|Q_B)$ represents the probability that the search result $U_i$ was selected by the second searcher.

3. The method of claim 1, wherein the search results for at least one query in the plurality of queries pertain to a single search session, wherein the single search session includes queries issued in a threshold amount of time or queries with similar informational goals.

4. The method of claim 1, wherein at least one search result selected by a user in response to the user issuing a query to the search engine is assigned to another query if the query and the another query occurred in a single search session.

5. The method of claim 1, further comprising:
receiving the first query from a user, wherein the user issues the first query to the search engine;
determining that the second query is to be provided to the user in a list of suggested alternate queries;
determining that the first query and the second query are included in the cluster of queries; and
removing the second query from the list of suggested alternate queries.

6. The method of claim 1, further comprising:
prior to determining the measures of similarity between the plurality of queries, determining that each query in the plurality of queries has a threshold number of selected search results that correspond thereto.

7. The method of claim 1, further comprising:
receiving a request from a user to view a history of queries; and
organizing queries in the history of queries for display to the user based at least in part upon measures of similarity between queries.

8. The method of claim 1, further comprising:
receiving a third query from a user initiating a search;
determining a measure of similarity between the received third query and at least one other query; and
displaying contributions to search query results based at least in part upon the measure of similarity between the received third query and the at least one other query, wherein the at least one other query is referenced by the contributions, wherein the contributions comprise at least one of comments made by one or more users, discussions, additions of search results, deletions of search results, re-rankings, or edits of suggested or related search queries.

9. The method of claim 1, further comprising:
receiving the first query from a user initiating a search; and
displaying the second query as a suggested query, wherein the first query and the second query are included in the cluster.

10. The method of claim 1, further comprising:
receiving a third query from a user;
determining that the third query is included in the cluster of queries;
replacing a term in the third query received from the user with a term in a fourth query included in the cluster of queries to generate a modified query; and
automatically executing a search using the modified query.

11. The method of claim 1, further comprising:
receiving a third query from a user;
determining that the third query is included in the cluster of queries; and
automatically executing a search utilizing another query from the cluster of queries responsive to receiving the third query from the user.

12. The method of claim 1, further comprising:
receiving a third query from a user;
determining that the third query is included in the cluster of queries; and
automatically providing another query from the cluster of queries to the user as a suggested query responsive to receiving the third query from the user.

13. The method of claim 1, further comprising:
receiving a third query from a user;
determining that the third query is included in the cluster of queries;
transmitting the third query and at least one other query in the cluster of queries to an advertisement server; and
displaying an advertisement to the user that is based upon the at least one other query.

14. A system comprising:
a processor; and
a memory that comprises a plurality of components that are executed by the processor, the plurality of components comprising:
a receiver component that receives a dataset that is stored in a computer-readable medium of a computing device, wherein the dataset comprises a plurality of queries issued by users to a search engine and a plurality of search results selected by the users upon issuing the plurality of queries;
a distribution determiner component that determines click distributions over the search results selected by the users with respect to the plurality of queries;
a labeler component that receives click distributions over the search results for query pairs and computes a measure of similarity between queries in each query pair based at least in part upon the click distributions over the search results, the measure of similarity being a cosine similarity of click distributions over respective sets of search results for the queries in each query pair, wherein labeler component computes the measure of similarity between a first query and a second query based at least in part upon a first probability that a first searcher that issued the first query will select a first search result, and a second probability that a second searcher that issued the second query will select the first search result, wherein the first probability and the second probability are computed based at least in part upon the click distributions over the search results for the first query and the second query;
a seed selector component that selects, as a seed query, a query most often issued by users of the search engine from unclustered queries in the plurality of queries; and
a clusterer component that generates a cluster of queries from the unclustered queries based at least in part upon the seed query and measures of similarity between the seed query and other respective queries in the unclustered queries, wherein the seed selector component and the clusterer component repeat acts of selecting seed queries and clustering queries until there are no unclustered queries in the plurality of queries.

15. The system of claim 14, wherein the cluster of queries output by the clusterer component comprises three or more queries.

16. The system of claim 14, wherein the dataset comprises a session click graph.

17. The system of claim 14, wherein the labeler component computes the measure of similarity between the first query and the second query through utilization of the following algorithm:

$$\text{measure of similarity} = \frac{\sum_i P(U_i | Q_A) P(U_i | Q_B)}{\sqrt{\sum_i P(U_i | Q_A)^2 \sum_i P(U_i | Q_B)^2}},$$

where $U_i$ represents an ith search result, $Q_A$ represents the first query, $Q_B$ represents the second query, $P(U_i|Q_A)$ represents a probability that the search result $U_i$ was selected by a user that issued the first query $Q_A$, and $P(U_i|Q_B)$ represents a probability that the search result $U_i$ was selected by a user that issued the second query $Q_B$.

18. The system of claim 14, wherein, for each cluster of queries, the clusterer component selects at least one key word from a respective cluster of queries, wherein the at least one key word is employed to summarize the respective cluster of queries.

19. The system of claim 14, wherein the clusterer component includes a third query in the cluster of queries only after determining that the third query has been issued to the search engine above a threshold number of times by users.

20. A computing device comprising a computer-readable hardware data storage device, the computer-readable hardware data storage device comprising instructions that, when executed by a processor, cause the processor to perform acts comprising:
accessing a data repository that comprises a dataset, wherein the dataset comprises a plurality of queries issued to a search engine by users and a plurality of search results selected by the users upon issuing the queries, wherein the dataset further comprises relationship data that indicates which queries were issued when certain search results were selected by the users;
determining click distributions over the search results selected by the users with respect to the plurality of queries;
determining a cosine similarity of click distributions over the search results with respect to a first query and a second query in the dataset based at least in part upon the determined click distributions over the search results selected by the users with respect to the first query and the second query, wherein the cosine similarity of click distributions is computed as a function of:
a first probability that a first searcher that issued the first query will select a first search result; and
a second probability that a second searcher that issued the second query will select the first search result, wherein the first probability and the second probability are computed based at least in part upon the click distributions over the sets of search results for each of the first query and the second query;

selecting a seed query from amongst unclustered queries in the plurality of queries, wherein the seed query is a query in the unclustered queries that has been issued most often to the search engine by the users;

generating, from the unclustered queries, a cluster of queries based upon the seed query, wherein the cluster of queries includes queries that have cosine similarity of click distributions with the seed query that are above a threshold;

labeling queries in the cluster of queries as being substantially similar to one another; and repeating acts of selecting, generating, and labeling until there are no unclustered queries in the plurality of queries.

* * * * *